INVENTOR.
BY WALTER S. WISEMAN
ATTORNEYS

Patented June 19, 1951

2,557,901

UNITED STATES PATENT OFFICE 2,557,901

ALTERNATING CURRENT EXCITED FREQUENCY CHANGER

Walter S. Wiseman, Dayton, Ohio, assignor to The Leland Electric Company, Dayton, Ohio, a corporation of Ohio Application December 1, 1950, Serial No. 198,537

8 Claims. (Cl. 321—7)

This invention relates to frequency changers of the rotating type.

In the operation of many devices a small high speed power supply is highly desirable since a greater economy of size and weight is obtainable in this way than with lower speed equipment. A motor operating with a 400 cycle power supply is much smaller, more compact and considerably lighter in weight than a motor of the equivalent horsepower rating operating from the conventional 60 cycle power supply. There are many applications where such small high speed motors are desirable subject to the availability of an economic, convenient, and reliable source of such 400 cycle power. For example in aircraft installations where weight is an important factor and where the entire electrical system is not operated on a 400 cycle basis, a converter of this type may be used to provide the high frequency power supply. Similarly, in the opeartion of pumps, such as for the submerged pumping of gasoline and the like from underground tanks, as in filling stations, the pump and the drive motor may be conveniently located below ground level and supplied from a 400 cycle source of power, with improved convenience and better performance of the entire system.

It is accordingly an object of the present invention to provide a power supply for furnishing a high frequency source of electrical power such as a three-phase 400 cycle supply from an ordinary single phase or two-phase 60 cycle commercial power line, which is in the form of a rotary converter that is simple, economical, and highly reliable in operation, providing for operation of the ordinary commercial 60 cycle supply lines and for producing the desired high frequency supply for the operation of motors and the like.

It is also an object of the invention to provide such a converter which does not require any source of direct current power, either from an outside source or self-generated, thereby further eliminating expense and the inherent problems connected with the use of such direct current supply.

Other objects and advantages will be apparent from the following description, the accompanying drawings and the appended claims.

In the drawings—

Figure 1:
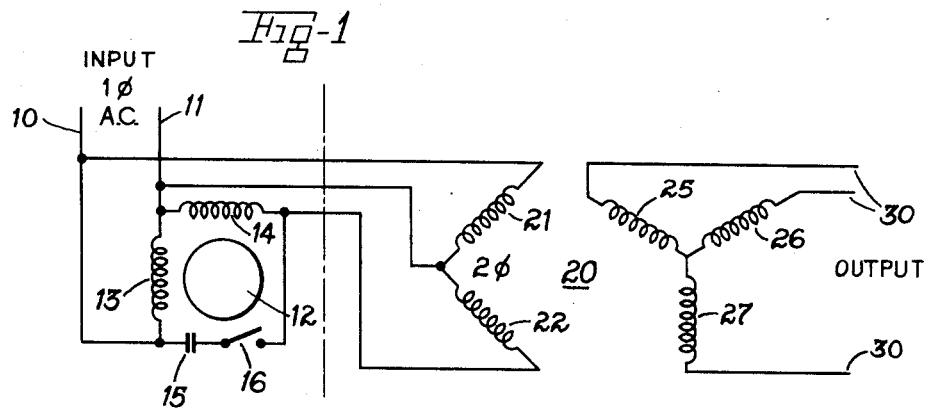
Fig. 1 is a schematic view showing the converter in accordance with the present invention in which the drive motor is a capacitor start, induction run type.

Referring to the drawings which disclose preferred and representative embodiments of the invention, in Fig. 1 the power supply is shown at 10, 11 consisting of the ordinary commercial 60 cycle single phase power supply lines. The drive motor in this case is shown as of the type known as capacitor start, induction run. That is, it has a squirrel cage rotor 12, a main winding 13 which remains energized during running and a starting winding 14 which is in quadrature relation with the running winding and is energized through a condenser 15 and the usual centrifugal or starting switch 16. This motor operates in the ordinary way, the switch 16 being closed upon starting to energize the starting winding, which thus produces a rotating field in conjunction with the main winding, causing the rotor to start to turn. As the motor approaches running speed, the centrifugal switch 16 opens the circuit to the starting winding and thereafter the motor runs on the running winding 13 alone as an induction motor.

In accordance with the present invention the generator which is shown generally at 20 comprises a wound rotor having two windings 21 and 22 thereon in quadrature relation to each other. These windings are connected respectively to the main winding 13 and to the starting winding 14, the latter connection being such that the winding 21 will continue to be energized from the starting winding 14 notwithstanding the opening of the centrifugal switch 16, by reason of the quadrature voltage induced in the starting winding by transformer action.

The stator of the generator is wound with a polyphase winding 25, 26, 27, preferably a three-phase winding, since that furnishes a desirable power supply for assuring the proper starting and running of remotely located motors and the like without requiring the use of starting switches or other special starting devices.

Since a higher frequency source of electrical power is desired, the generator is preferably wound with a larger number of poles than the number of poles in the drive motor. As illustrative of an arrangement which has been found to give highly satisfactory results, the motor is a two pole motor and hence operates at a speed, under load, of approximately 3400 R. P. M. The number of poles in the rotor of the generator is the same as the number of poles in the stator, a preferred design being to have 12 such poles in the generator. It will thus be obvious that due to the rotation alone, the generator if supplied with direct current energization would develop power at a frequency of $$\frac{12}{2} \times \frac{3400}{60} = 340$$

That is, such a generator if the energizing field were direct current, would produce an output frequency of 340 cycles per second. However the present generator is energized from a 60 cycle power supply and it will be obvious that the frequency of the power supplied to the two windings 21 and 22 in the rotating field of the generator remains the same as that of the power supply 10, 11 since winding 21 is directly connected to the power supply and winding 22 is connected to the starting winding 14 in which an induced voltage occurs of the same frequency. The connections are preferably such that the rotating field produced by this alternating power supply is additive with respect to the rotation of the generator and hence the final frequency in the output 30 of the generator is 340+60=400 cycles. If desired, the direction of rotation of the generator field may be reversed by simply reversing the connections of two of the lines supplying the field windings, in which case the frequencies will subtract and the output frequency will be 280 cycles.

Figure 2:
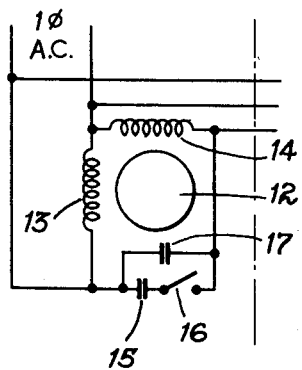
Fig. 2 is a partial view showing the substitution of a capacitor start, capacitor run type of drive motor in place of the drive motor in Fig. 1.

The remaining figures show modifications of the drive source, Fig. 2 showing a capacitor start, capacitor run type of drive motor in which an auxiliary condenser 17 remains in circuit after the starting switch 16 has opened the circuit through condenser 15.

Figure 3:
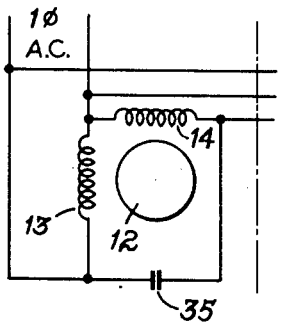
Fig. 3 is a view showing the substitution of a capacitor start and run motor in the system.

Fig. 3 shows a capacitor start and run motor in which the condenser 35 remains in circuit with the starting winding and in which no centrifugal switch is provided.

Figure 4:
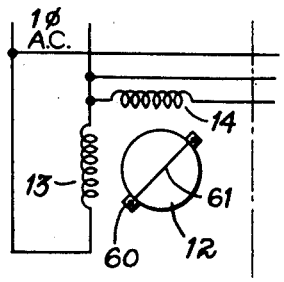
Fig. 4 is a view showing the substitution of a repulsion start, induction run motor in the system.

Fig. 4 indicates the repulsion start, induction run type of motor with brushes 69 shortcircuited by connection 61. In each of these three cases the operation of the system remains the same as above described, the selection of the particular type of drive motor being made in accordance with other factors, while still retaining the same operating characteristics so far as the novel features of the invention are concerned.

Figure 5:
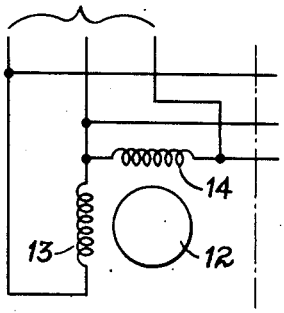
Fig. 5 is a view showing an induction start and run motor energized from a two-phase power supply.

Fig. 5 shows a still further arrangement in which the motor is operated from a two-phase 60 cycle power supply, the connections and mode of operation in this case being the same as above described.

The invention therefore represents and provides an improved frequency changer or converter of the rotating type, entirely eliminating the need for any supply of direct current, and accomplishing the desired result of producing a reliable and economical source of high frequency, such as 400 cycle power, single phase or polyphase as preferred for most desirable operation of associated equipment, from a simple 60 cycle single phase ordinary commercial power supply.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An alternating current excited frequency changer for producing a supply of polyphase high frequency power from a single phase low frequency source which comprises a drive motor having an in-phase winding and a quadrature winding, a generator coupled to and rotatable with said motor, said generator having a pair of windings on its rotor in quadrature relation with each other, means connecting said rotor winding respectively with said in-phase winding and with said quadrature windings of said motor, and a polyphase winding on a stator of said generator for obtaining the high frequency polyphase power output.

2. An alternating current excited frequency changer for producing a supply of high frequency power from a single phase low frequency source which comprises a drive motor having an in-phase winding and a quadrature winding, a generator coupled to and rotatable with said motor having a greater number of poles than said motor, said generator having a pair of windings on its rotor in quadrature relation with each other, means connecting said rotor windings respectively with said in-phase and with said quadrature motor windings, and a winding on the stator of said generator for obtaining the high frequency power output.

3. An alternating current excited frequency changer for producing a supply of polyphase high frequency power from a single phase low frequency source which comprises a drive motor having a main running winding and a starting winding in quadrature therewith, a generator coupled to and rotatable with said motor, said generator having a pair of windings on its rotor in quadrature relation with each other, means connecting said rotor windings respectively with said running winding and with said quadrature winding of said motor to produce a two-phrase energizing field in said generator, and a three-phase winding on the stator of said generator for obtaining the polyphase high frequency power output.

4. An alternating current excited frequency changer for producing a supply of polyphase high frequency power from a single phase low frequency source which comprises a drive motor having a main running winding and a starting winding in quadrature therewith, a generator coupled to and rotatable with said motor, said generator having a pair of windings on its rotor in quadrature relation with each other, means connecting said rotor windings with said running winding and with said starting winding of said motor respectively forming a rotating field and with the direction of rotation being additive with the rotating field, and a polyphase winding on the stator of said generator for obtaining the high frequency power output.

5. A frequency changer for producing a polyphase high frequency power supply from a low frequency source without the use of direct current which comprises a drive motor having a plurality of windings in quadrature relation, a generator driven by said motor having a stator and a wound rotor, said rotor having windings thereon in quadrature relation, means connecting said drive motor windings with said rotor windings respectively, and a polyphase winding on the stator of said generator forming the high frequency power supply.

6. A frequency changer for producing a polyphase high frequency power supply from a low frequency source without the use of direct current which comprises a drive motor having a plurality of windings in quadrature relation, a generator driven by said motor having a stator and a wound rotor, said rotor having windings thereon in quadrature relation and with an increased number of poles with respect to the motor windings, means connecting said drive motor windings with said rotor windings respectively, and a polyphase winding on the stator of said generator having the same number of poles as the windings on said rotor and forming the polyphase high frequency power supply.

7. A frequency changer for producing a polyphase high frequency power supply from a single phase low frequency supply in the absence of direct current comprising a single phase drive motor having a starting winding and a running winding in quadrature relation therewith, a generator driven by said motor and having a stator and a wound rotor with like number of poles, the number of said poles being greater than the number of poles on the windings of said drive motor, said rotor having windings thereon in quadrature relation, means connecting the starting and running windings of said motor with said rotor windings respectively, and a three-phase winding on the stator of said generator forming the polyphase high frequency power supply.

8. A frequency changer for producing a polyphase high frequency power supply from a single phase low frequency supply in the absence of direct current comprising a single phase drive motor having a starting winding and a running winding in quadrature relation therewith, a generator driven by said motor and having a stator and a wound rotor with like numbers of poles, the number of said poles being greater than the number of poles on the windings of said drive motor, said rotor having windings thereon in quadrature relation, means connecting the starting and running windings of said motor with said rotor windings respectively and in the direction to be additive with the rotation of the generator, and a three-phase winding on the stator of said generator forming the polyphase high frequency power supply.

WALTER S. WISEMAN.

REFERENCES CITED

The following references are of record in the file of this patent:

UNITED STATES PATENTS

| Number | Name | Date |
|---|---|---|
| 1,423,959 | Mittag | July 25, 1922 |